(No Model.)

W. FRY.
HASP LOCK.

No. 298,965. Patented May 20, 1884.

Witnesses:
Dayton A. Doyle
J. H. Simmons

Inventor:
William Fry,
by C. F. Humphrey
Atty.

UNITED STATES PATENT OFFICE.

WILLIAM FRY, OF AKRON, OHIO.

HASP-LOCK.

SPECIFICATION forming part of Letters Patent No. 298,965, dated May 20, 1884.

Application filed October 6, 1883. (No model.)

*To all whom it may concern:*

Be it known that I, WILLIAM FRY, a citizen of the United States, residing at the city of Akron, in the county of Summit and State of Ohio, have invented a new and useful Improvement in Hasp-Locks, of which the following is a specification.

My invention has for its object the construction of a safe and simple lock-hasp.

Figure 1:
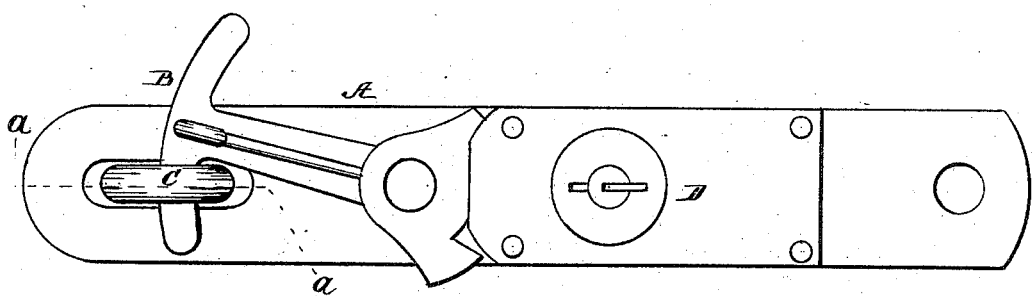
Figure 2:
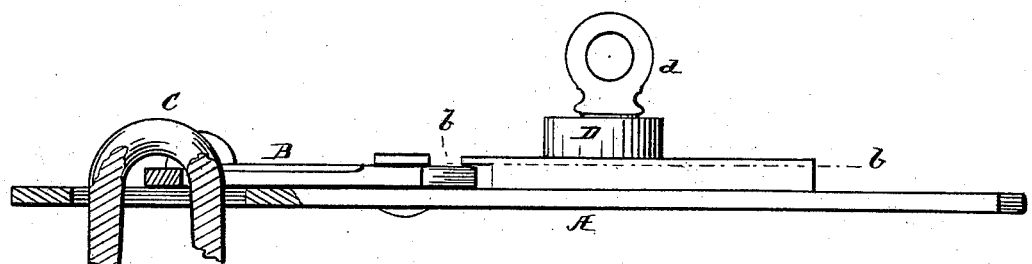
Figure 3:
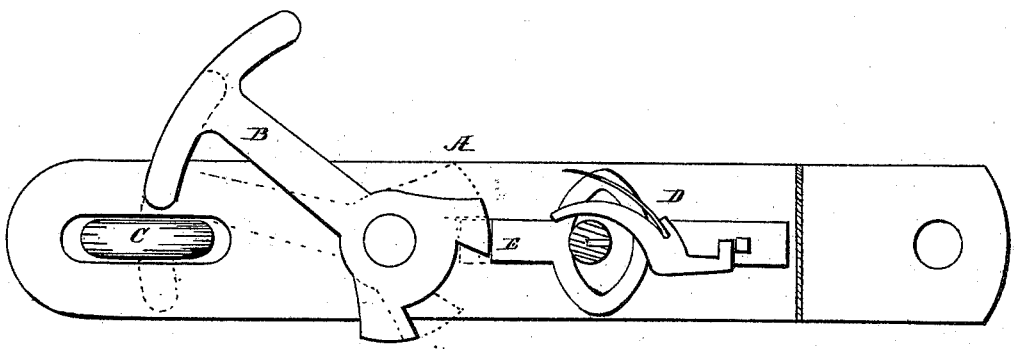

It consists of the devices shown in the accompanying drawings, in which Figure 1 is a front elevation; Fig. 2, a plan, a part being shown in section on the line $a\ a$ of Fig. 1; and Fig. 3, a front elevation with the lock-plate removed at the line $b\ b$.

The hasp A consists of a bar of metal of the form shown, having a hole at one end for the attaching-staple, and at the other a slot for the locking-staple C. Pivoted to the bar is the hook B, adapted to enter the locking-staple C from either side, as its use may require. Between the hook and attaching-staple is a lock, D, in which a bolt, E, is, by a key, $d$, thrown toward or withdrawn from the hook B. The hook B terminates rearwardly in two lugs so arranged that when the hook is withdrawn from the locking-staple one of them will encounter the end of the bolt E and prevent it being thrown forward; but the hook, being placed in the staple from either side, will permit the bolt E to be thrown forward between the lugs, and when so thrown forward it will, by encountering one of the lugs, prevent the hook being withdrawn from the locking-staple.

I claim—

The combination, with a hasp, of a hook pivoted thereto and provided with rearwardly-projecting lugs, and a lock attached to said hasp provided with a reciprocating bolt adapted, when thrown forward, to engage one of said lugs and retain the hook in position, all constructed and arranged as shown, and for the purpose specified.

In testimony that I claim the foregoing I have hereunto set my hand this 8th day of September, A. D. 1883.

WILLIAM FRY.

Witnesses:
C. P. HUMPHREY,
DAYTON A. DOYLE.